United States Patent [19]

Allen et al.

[11] 4,026,063
[45] May 31, 1977

[54] PACK FOR FISHING LINE DISPENSING

[76] Inventors: Barrie Alistair James Allen, 5 Beechcroft Road; John Grimes Allen, 17 Powys Ave., both of Leicester; John Sheppard, 21, St. Martins Square, Chichester, Sussex; Dermot Needham Furnival Wilson, Nether Wallop Mill, Stockbridge, Hampshire, all of England

[22] Filed: June 1, 1976

[21] Appl. No.: 691,872

[30] Foreign Application Priority Data

Feb. 24, 1976 United Kingdom .............. 7170/76

[52] U.S. Cl. .................. 43/54.5 R; 242/137.1; 206/408; 223/107; 220/20
[51] Int. Cl.² .................................. A01K 97/00
[58] Field of Search ............... 206/408; 43/54.5 R; 223/107; 242/137.1, 137, 129.8, 146; 220/20, 22

[56] References Cited

UNITED STATES PATENTS

| 2,537,940 | 1/1951 | Peake | 223/107 |
|---|---|---|---|
| 3,612,427 | 10/1971 | Bishop | 242/137.1 |
| 3,962,815 | 6/1976 | Christensen | 43/54.5 R |

*Primary Examiner*—George T. Hall
*Attorney, Agent, or Firm*—Diller, Brown, Ramik & Wight

[57] ABSTRACT

The invention relates to a convenient pack for a fisherman to carry in his pocket or bag to contain spools of replacement leader line for carrying bait, etc., at the end of the main fishing line. The container comprises several compartments having central studs on which the spools are located, at least one wall of each compartment preferably being transparent for spool identification. Each compartment also has outlet means in the side wall through which the leader line is pulled out, but which do not permit it inadvertently to slip back into the compartment.

6 Claims, 2 Drawing Figures

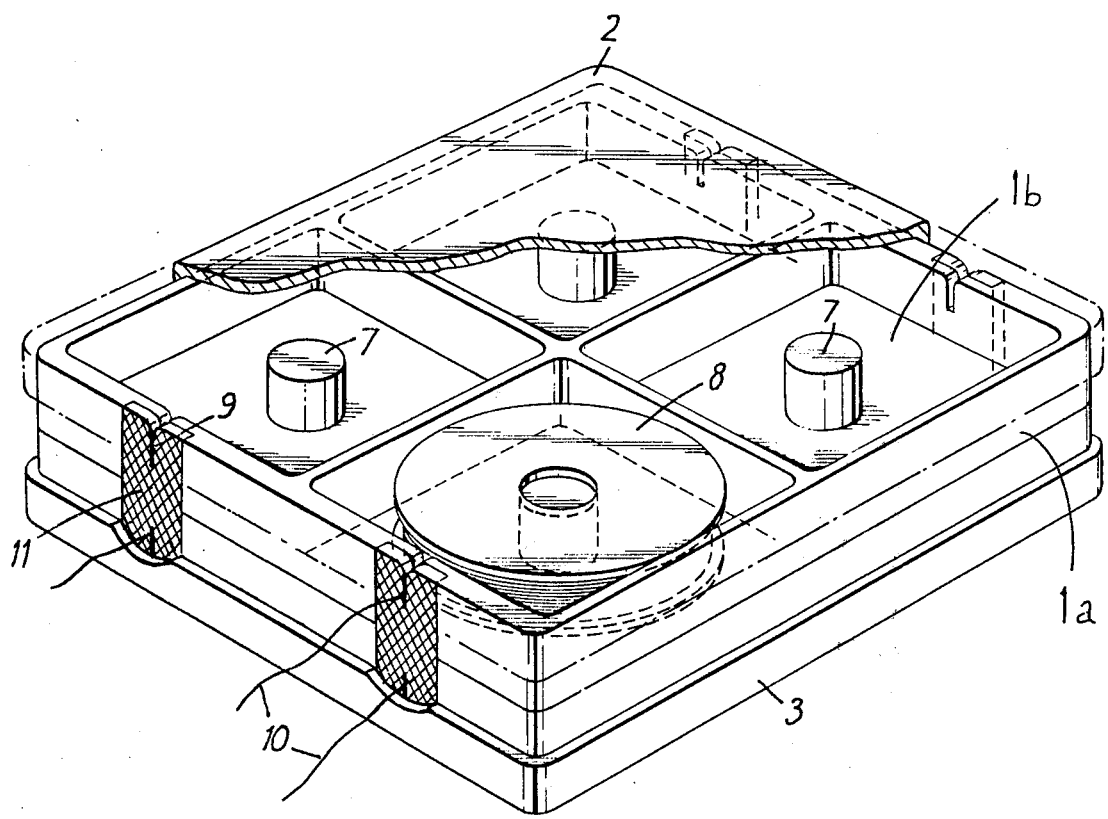

PACK FOR FISHING LINE DISPENSING

BACKGROUND OF THE INVENTION

This invention relates to a dispensing pack for fishing line or like monofilament.

In the practice of fly, bait or lure fishing, the main fishing line is provided at its free end with a so-called cast or leader which carries the fly, bait or lure. This leader is usually from three to nine feet in length, but, during fishing, when the fly, bait or lure requires to be changed or is damaged or lost, the leader becomes progressively shorter. To compensate for this, a length or lengths of monofilament may be used to make up the leader to its original length. The monofilament is normally supplied in spools or cartridges and comes in different gauge for different purposes. Thus the different gauges may be used in accordance with the weight of the fish or size of the fly, lure or bait to be attached. Thus a number of spools each carrying a type of monofilament of different diameter, weight and breaking strain need to be carried by the fisherman.

In practice the spools have been carried loose by the fisherman, but this is an inconvenient and unsatisfactory way to carry them around and to choose and detach the length of required monofilament on any particular occasion. Moreover the spools easily become damaged or the monofilament tangled.

BRIEF SUMMARY OF THE INVENTION

The present invention has been devised to deal with these shortcomings, to which end it provides a pack for a plurality of wound spools comprising a housing which defines a plurality of spool compartments, means in each of said compartments for locating and mounting the spool, an outlet opening from a side wall in each compartment to facilitate the exit of the filament prior to severing, and means to prevent inadvertent withdrawl of the monofilament into the compartment.

Advantageously, at least one wall of each compartment is of transparent plastics material.

Thus, by use of the pack of this invention a plurality of spools of different character can conveniently be handled and carried in the pocket ready for immedaite and effective use. The transparent wall enables each spool to be identified as to type, diameter and breaking strain, and the fact that the end of the monofilament projects from each spool out of the pack in each case through an opening in the side of its compartment enables it to be drawn out immediately to the required length for severing.

The outlet opening referred to can be formed by a grommet or other means, but of a nature such that it will allow the required length of monofilament to be pulled out and held against accidental retraction, i.e. so that after severing, a short length is left hanging from the exterior of the wall of the pack for extraction when next required. In a preferred instance each outlet is provided by a slot running from the free edge of the wall of the housing at the compartment, this slot providing a gripping bite. For example the part of the wall concerned will be of a resilient material which will perform the required gripping function.

BRIEF DESCRIPTION OF DRAWINGS

There will now be described, with reference to the accompanying drawings, an example of a pack according to the invention. It will be understood that the description is given by way of example only and not by way of limitation of the invention.

In the drawings:

FIG. 2 shows a multi-row version of the pack.

DETAILED DESCRIPTION OF THE DRAWINGS

Figure 1:
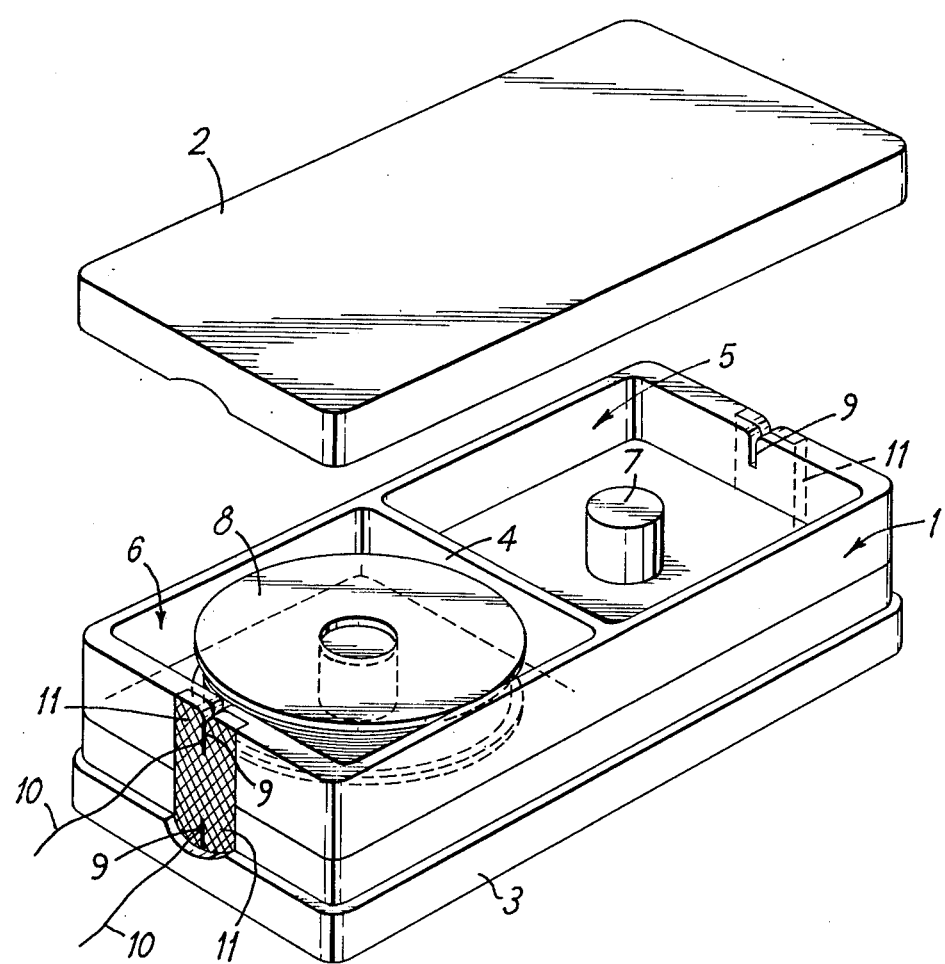
FIG. 1 shows a pack comprising four compartments arranged in an upper set of two and a lower set of two.

FIG. 1 shows a pack comprising a housing 1 of rectangular plan having a side wall 1a surrounding a plate 1b which acts as a base for two sets of rectangular compartments 5 and 6, the upper set being closed by a transparent closure 2 and the lower set by a transparent closure 3. These closures are of plastics material and are press-fits on the side wall 1a.

The upper set of compartments 5 and 6 are formed by a dividing wall 4 upstanding from the plate 1b. Also upstanding from the plate 1b in the centre of each compartment is a stud 7 which forms a central locating spindle for a point spool such as that shown at 8 mounted on its stud in the left-hand compartment 6.

Provided at the end wall of each compartment is an insert 11 of rubber or a soft plastics material having a central slit 9 running from the upper or free edge thereof. This slit provides for the emergence of a length of the monofilament from the relevant spool, as indicated at 10, and for gripping this length.

The other and bottom half of the housing 1 is identical with the top housing described above.

FIG. 2 shows a multi-row pack which in essence comprises two packs as shown in FIG. 1, merged along adjacent portions of the side wall 1b to form a set of four compartments on each side of the plate 1a. A single closure 2 or 3 is provided to cover the compartments in the two sets. It will be understood that, if desired, three or more such packs may be merged together, the only practical limitation being inconvenience of size in some cases, leading to difficulty in handling.

As will be observed it is a simple matter to place spools in the various compartments of the unit, leaving a short length of monofilament trailing from each compartment. When a fresh length is required by the fisherman all he has to do is to pick the unit up, read the labels on the spools, choose the type he requires, pull out the appropriate length, cut it off, leaving a small end trailing, and return the unit to his pocket in a very simple and convenient operation.

We claim:

1. A pack for a plurality of wound spools comprising a housing which defines a plurality of spool compartments, means in each of said compartments for locating and mounting a spool, an outlet opening from a side wall in each compartment to facilitate the exit of a filament from the spool prior to severing and means to prevent inadvertent withdrawl of the monofilament back into the compartment.

2. A pack as claimed in claim 1 wherein at least one wall of each compartment is of transparent plastics material.

3. A pack as claimed in claim 1 wherein there are two sets of compartments, one set on each of two sides of a plate of the housing said plate forming the bottom of each compartment.

4. A pack as claimed in claim 2 wherein there are two compartments in each set.

5. A pack as claimed in claim 2 wherein there are three or more compartments in each set.

6. A pack as claimed in claim 1 wherein the opening in the side wall of each compartment is provided with a resilient insert having a slot through which the filament is pulled to remove a length thereof from the spool, said insert and slot providing said means to prevent inadvertent withdrawal of the filament back into the compartment.

* * * * *